Aug. 20, 1957  E. F. MacNICHOL, JR  2,803,415
NAVIGATION CONTROL SYSTEM
Filed March 21, 1946

INVENTOR.
EDWARD F. MAC NICHOL, JR.
BY
M. Q. Hayes
ATTORNEY

United States Patent Office 2,803,415
Patented Aug. 20, 1957

2,803,415

NAVIGATION CONTROL SYSTEM

Edward F. MacNichol, Jr., Hamilton, Mass., assignor, by mesne assignments, to the United States of America as represented by the Secretary of the Navy Application March 21, 1946, Serial No. 655,984

8 Claims. (Cl. 244—77)

This invention relates to radio navigation control systems and more particularly to a hyperbolic navigation system for control of guided missiles.

Existing radio and radar systems for control of moving objects such as flying missiles require either tracking of the missile by radar or transmission of information from the missile in order that its path and position may be continuously determined and corrected. Such systems are at a disadvantage in that only a limited number of missiles can be controlled simultaneously and a limited control range is available unless the missiles carry beacons.

The present invention overcomes the foregoing limitations and provides for control of an unlimited number of missiles carrying simple receiving apparatus.

An object of this invention is to provide a system for automatically guiding mobile objects such as guided missiles along a hyperbolic course from a given starting point to a predetermined destination.

Another objects is to control automatically the flight of a pilotless craft or a guided missile along a hyperbolic course and its release at the proper time to hit a selected target.

Another object is to provide apparatus for automatically guiding an unlimited number of missiles simultaneously along the same course.

These and other objects and features of this invention will become apparent upon consideration of the following detailed description when taken together with the accompanying drawings, in which.

Hyperbolic navigation is achieved when synchronized electromagnetic signals are transmitted from at least three given points and when the relative times of arrival of these signals at a remote point are measured and interpreted. A number of kinds of signals, ranging from continuous waves through modulated waves to pulses, may be used. In the more useful applications, pulse transmission is preferred as ambiguity is minimized and the power supplied to transmitters may be kept low.

Consider two fixed stations to transmit pulse signals at the same instant. If a receiver remote from the stations receives these signals simultaneously, then the receiver must be located somewhere along the perpendicular bisector of the line connecting the transmitting stations. If one signal arrives before the other, a measurement of the time difference identifies some other line of position on which the receiver is located. These lines of position turn out to be approximately spherical hyperbolas but may usually be represented by plane hyperbolas drawn on a conformal conic projection.

Figure 1:
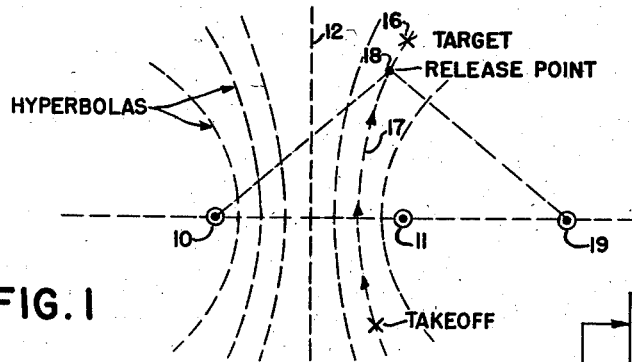
Fig. 1 illustrates an arrangement of ground control stations with respect to the take-off point and target of a missile to be guided along a hyperbolic course according to this invention.

This is illustrated in Fig. 1 where fixed transmitting stations are considered to be located at widely separated points 10 and 11. The time between firing of transmitters 10 and 11 is variable at will. When 10 and 11 transmit simultaneously, their signals will likewise be received simultaneously at any given point on the line 12 which is the perpendicular bisector of the line connecting transmitters 10 and 11. If transmitter 10 fires before 11, the points of simultaneous receipt of signals will fall on a hyperbolic line to the right of line 12. Conversely, the hyperbolic line is to the left of line 12 if transmitter 11 fires before 10. As the delay between the firing of transmitter 10 and 11 increases, the hyperbolic lines move out from the center line 12. It will be readily apparent that each hyperbolic line shown in Fig. 1 also represents the locus of all points at which signals are received from transmitters 10 and 11 at a constant difference in time. Therefore, by varying the time between firing of transmitters 10 and 11, the hyperbolic line which represents any given time difference for receipt of signals can be shifted to make it lie across any desired target. For instance in Fig. 1, if a target lies at point 16, a hyperbolic line such as 17, representing a constant difference in time to which a receiver in a guided missile is adjusted, can be made to lie across point 16 by adjusting the delay time between the firing of transmitters 10 and 11. The release point 18 at which the missile begins its descent on nearing the target 16 is established by using another transmitter 19 and adjusting the firing time between transmitters 10 and 19 such that their signals reach the release point simultaneously to actuate the missile's release mechanism. Thus varying the time between firing of transmitters 10 and 11 provides for varying the flight of the missile in azimuth and varying the time between firing of transmitters 10 and 19 provides for varying the range of the missile's release point.

Figure 2:
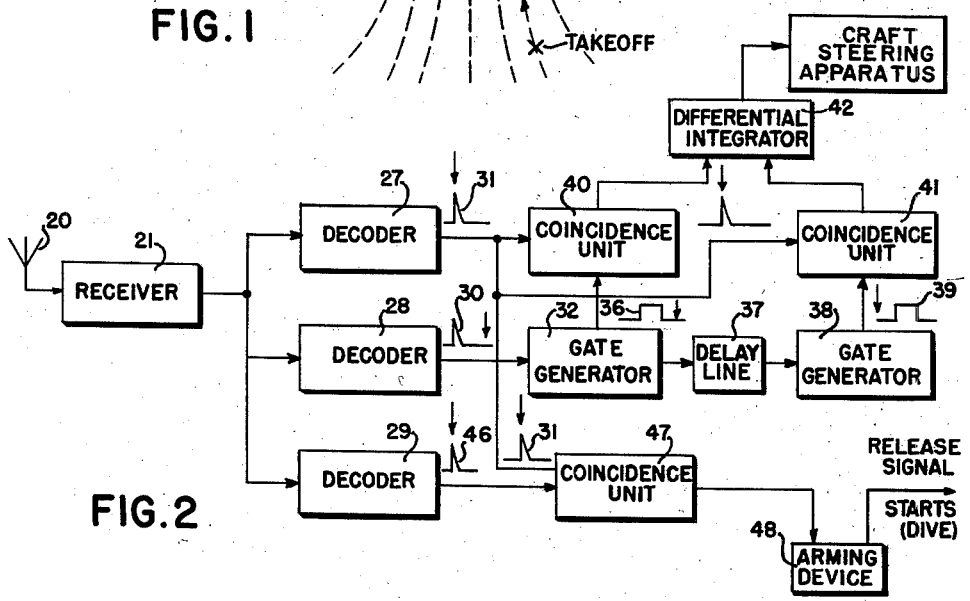
Fig. 2 is a block diagram of the receiver apparatus in the guided missile for receiving and decoding signals from the ground control stations.

In Fig. 2 is shown a block diagram of the receiver apparatus in the guided missile which is responsive to the signals from stations 10, 11 and 19 for controlling the flight of the guided missile. The transmitted pulses from stations 10, 11 and 19 are all coded distinctively and this can be accomplished simply by using double pulses with different delay times between the double pulses from each transmitter. The transmitted pulses are picked up by antenna 20 on the guided missile, amplified and video detected in receiver 21, and the video pulses are then applied to decoders 27, 28 and 29. One existing form of decoder provides for addition of two or more pulses properly spaced apart in time to achieve an amplitude sufficient to trigger associated circuits. Thus the decoders constitute detecting means, decoder 27 being responsive to signals from transmitter 10, decoder 28 to signals from transmitter 11, and decoder 29 to signals from transmitter 19.

In this illustration of the invention, the guided missile is considered to follow a hyperbolic line along which it receives signals from transmitter 10 at a fixed delay in time behind transmitter 11. Therefore, output trigger 30 from decoder 28 precedes output trigger 31 from decoder 27. The vertical arrows over the trigger waves indicate an arbitrary common time reference of $t=0$ at which time trigger 31 occurs. Trigger 30 triggers gate generator unit 32 to provide output gate 36 which is delayed by delay line 37 and then triggers gate generator unit 38 whose output is gate 39. By the term gate as used in this specification is meant a voltage pulse used for gating or otherwise enabling a succeeding circuit. The gates 36 and 39 thus constitute a double gate with the gap between them so timed as to bracket trigger 31 when the guided missile is following the correct hyperbolic path. Trigger 31 and gate 36 are supplied to coincidence unit 40, for instance, to the control grid and screen grid respectively of a pentode employed as a coincidence amplifier. Trigger 31 and gate 39 are similarly supplied to coincidence unit 41. Thus when the guided missile is on course and trigger 31 occurs during the gap between gates 36 and 39, no output results from either coincidence units 40 or 41. However, if the missile drifts off course, trigger 31 occurs early or late with respect to the gap between gates 36 and 39. Trigger 31 will then coincide with leading gate 36 or lagging gate 39, which gates condition coincidence units 40 or 41 respectively to fire on receipt of a control grid signal such as trigger 31. The outputs of coincidence units 40 or 41 constitute error signals signifying that the guided missile is off course. It is assumed that the guided missile will have gyro stabilized flight controls and that steering will be accomplished by adding a correction to these controls. Correction is provided for the flight controls by applying the error signal outputs of coincidence units 40 and 41 respectively to differential integrator unit 42, whose output becomes a correction signal to control the steering apparatus to bring the guided missile back into the proper course. It will be observed that decoders 27 and 28, gate generators 32 and 38, delay line 37 and coincidence units 40 and 41 constitute a means for establishing a standard predetermined time interval between reception of signals from transmitters 10 and 11 and for providing an error control signal through differential integrator unit 42 when a time interval differing from the standard is detected and a course correction of the guided missile is required.

To control the release point of the guided missile, trigger 31 resulting from reception of transmission from station 10 and trigger 46 resulting from signals from transmitter 19 as decoded by unit 29 are applied to coincidence unit 47. When the signals from transmitters 10 and 19 reach the guided missile at the same time, coincidence unit 47 fires, actuating arming device 48 of the missile which in turn starts the missile on its descent towards the target. Coincidence unit 47 could of course enable any other type of desired control circuit.

Figure 3:
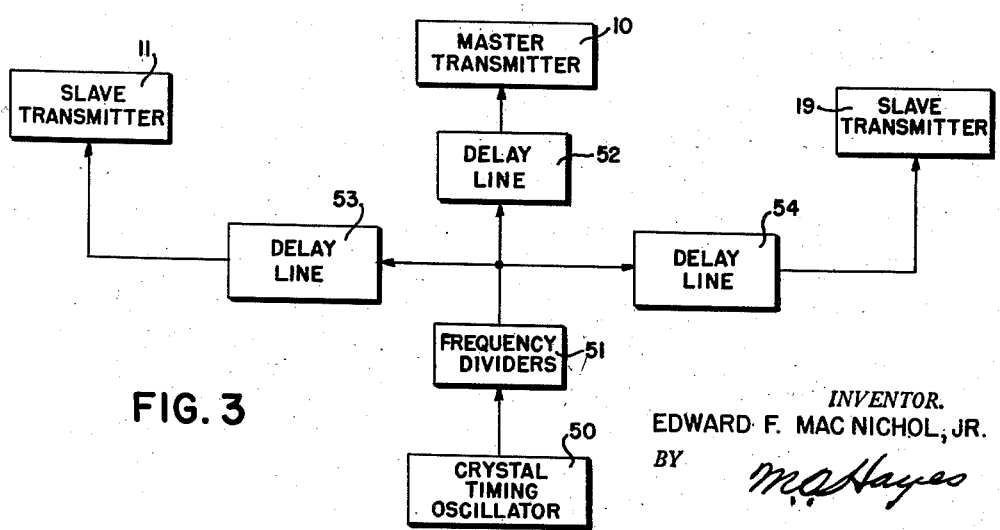
Fig. 3 is a block diagram of a timing arrangement of the ground control stations.

Fig. 3 illustrates a possible timing or synchronizing arrangement of the ground control transmitter stations 10, 11 and 19. The master timer is a crystal timing oscillator 50 whose output frequency is stepped down to the pulse repetition frequency of the transmitters through suitable frequency dividers 51. Variable delay line 52 establishes the time of firing of transmitter 10 which is designated as the master transmitter. Variable delay line 53 functions similarly for transmitter 11 and variable delay line 54 for transmitter 19. The delay times of lines 52 and 53 can be varied to establish a desired delay between transmitters 10 and 11 and provide control of the hyperbolic course which the guided missile follows. Delay lines 52 and 54 similarly establish the delay between transmitters 10 and 19 and provide for setting the release point at any predetermined point along the hyperbolic course.

Thus, in the embodiment of this invention described above and illustrated in Figs. 1, 2 and 3, a system has been provided for automatic navigation of a mobile object such as a guided missile along a hyperbolic course between a take-off point and a target. Although there is shown and described only a certain specific embodiment of this invention, the many modifications possible thereof will be readily apparent to those skilled in the art.

What is claimed is:

1. An automatic hyperbolic navigation system for guiding a mobile object along a predetermined course comprising, first and second spaced ground transmitters of synchronized coded pulse signals of electromagnetic energy, first and second decoding means at said object for receiving and separating said coded signals of said first and second transmitters, a control pulse generator responsive to said decoded signals from said second transmitter for producing a double pulse bracketing in time of occurrence the reception of said decoded signals from said first transmitter, a first coincidence circuit responsive to the decoded signals from said first transmitter and actuated by the leading pulse of said double pulse generator for producing a first error signal, a second coincidence circuit responsive to the decoded signal from said first transmitter and actuated by the lagging pulse of said double pulse generator for producing a second error signal, and a differential integrator responsive to said first and second error signals for producing a correction signal to control the steering of said mobile object.

2. An automatic hyperbolic navigation system for guiding a mobile object along a predetermined course comprising, first, second, and third spaced ground transmitters of synchronized coded pulse signals of electromagnetic energy, first, second and third decoding means for detecting respectively the reception at said object of said coded signals of said first, second and third transmitters, a control pulse generator responsive to said decoded signals from said second transmitter for producing a double pulse bracketing in time of occurrence the reception of said decoded signals from said first transmitter, a first coincidence circuit responsive to the decoded signals from said first transmitter and actuated by the leading pulse of said double pulse generator for producing a first error signal, a second coincidence circuit responsive to the decoded signal from said first transmitter and actuated by the lagging pulse of said double pulse generator for producing a second error signal, a differential integrator responsive to said first and second error signals for producing a correction signal to control the steering apparatus of said mobile object, and a third coincidence circuit responsive to the combined input of said decoded signals from said first transmitter and said decoded signals from said third transmitter for producing a control signal when said first and third decoded signals reach said mobile object in time coincidence.

3. In a radio navigation system having plurality of separated stations for transmitting groups of differently spaced pulses, said groups having equal periodicity, apparatus for guiding a moving craft along a path defined by a predetermined time interval between the reception of said groups of pulse signals at said craft comprising, a receiver for said signals located on said craft, a plurality of decoders connected to said receiver and responsive to the spacing of said pulses to separate groups of pulses from each transmitting station, a pair of normally nonconducting coincidence circuits, means to connect the output of the first of said decoders to the inputs of said coincidence circuits, means responsive to the output of the second of said decoders to render first one and then the other of said pair of coincidence circuits conductive for short time intervals, means to control the steering of said craft in accordance with the relation between the currents flowing in said pair of coincidence circuits, whereby said craft follows a path wherein said currents are equal, and a third coincidence circuit responsive to the combined outputs of the third of said decoders and said first decoder to produce an output signal when said first and third decoded signals reach said craft in time coincidence and said craft arrives at a predetermined location.

4. In a radio navigation system having plurality of separated stations for transmitting groups of differently spaced pulses, said groups having equal periodicity, apparatus for guiding a moving craft along a path defined by a predetermined time interval between the reception of said groups of pulse signals at said craft comprising, a receiver for said signals located on said craft, a plurality of decoders connected to said receiver and responsive to the spacing of said pulses to separate groups of pulses from each transmitting station, a pair of normally non-conducting coincidence circuits, means to connect the output of the first of said decoders to the inputs of said coincidence circuits, means responsive to the output of the second of said decoders to render first one and then the other of said pair of coincidence circuits conductive for short time intervals, integrating means to control the steering of said craft in accordance with the integral of the difference between the currents flowing in said pair of coincidence circuits, whereby said craft follows a path wherein said currents are equal, and a third coincidence circuit responsive to the combined outputs of the third of said decoders and said first decoder to produce an output signal when said first and third decoder signals reach said craft in time coincidence and said craft arrives at a predetermined location.

5. In a radio navigation system having plurality of separated stations for transmitting groups of differently spaced pulses, said groups having equal periodicity, apparatus for guiding a moving craft along a path defined by a predetermined time interval between the reception of said groups of pulse signals at said craft comprising, a receiver for said signals located on said craft, a plurality of decoders connected to said receiver and responsive to the spacing of said pulses to separate groups of pulses from each transmitting station, a pair of normally non-conducting coincidence circuits, means to connect the output of the first of said decoders to the inputs of said coincidence circuits, means responsive to the output of the second of said decoders to render first one and then the other of said pair of coincidence circuits conductive for short time intervals, means to integrate the difference between the currents flowing in said pair of coincidence circuits, means to control the steering of said craft in accordance with the output of said integrating means, whereby said craft follows a path wherein said currents are equal, and a third coincidence circuit responsive to the combined outputs of the third of said decoders and said first decoder to produce an output signal when said first and third decoder signals reach said craft in time coincidence and said craft arrives at a predetermined location.

6. In a radio navigation system having a plurality of separated stations for transmitting groups of differently spaced pulses in coded sequence, said groups having equal periodicity, apparatus for guiding a moving craft along a path defined by a predetermined time interval between the reception of said pulse signals at said craft comprising, a receiver located on said craft, a plurality of decoders connected to said receiver and responsive to the spacing of said pulses for separating pulses of each station, a gate generator responsive to the output of the first of the said decoders for generating a first gate followed by a second gate, the termination of said first gate and the initiation of said second gate occurring at a predetermined time interval following the occurrence of the output of said first decoder, a first coincidence circuit responsive to the output of the second of said decoders and energized by said first gate to produce a first control signal, a second coincidence circuit responsive to the output of said second decoder and energized by said second gate to produce a second control signal, and means for integrating the difference between said first and second control signals to produce an error signal to control the steering of said object.

7. In a radio navigation system having a plurality of separated stations for transmitting groups of differently spaced pulses and coded sequence said groups having equal periodicity, apparatus for guiding a moving craft along a path defined by a predetermined time interval between the reception of said pulse signals at said craft comprising, a receiver located on said craft, a plurality of decoders connected to said receiver and responsive to the spacing of said pulses for separating pulses of each station, a gate generator responsive to the output of the first of said decoders for generating a leading gate followed by a lagging gate separated in time at a predetermined time interval following the output of said first decoder, a first coincidence circuit responsive to the output of the second of said decoders and energized by said leading gate to produce a first control signal, a second coincidence circuit responsive to the output of said second decoder and energized by said lagging gate to produce a second control signal, and means for integrating the difference between said first and second control signals to produce an error signal to control the steering of said object.

8. Apparatus for the controlled navigation of a mobile object along a course established by a constant time interval between reception of coded pulse signals from a pair of widely separated synchronized transmitters comprising, means at said object for receiving and separating said coded signals to derive first and second signals corresponding to each of said transmitters, respectively, means responsive to said first signal for generating a pair of control pulses having a predetermined interpulse spacing, a pair of normally nonconducting coincidence circuits, means for applying said second signal to both of said coincidence circuits, means for applying the first of said control pulses to one of said coincidence circuits and the other of said control pulses to the second of said coincidence circuits whereby an error signal is produced by one or the other of said coincidence circuits whenever said second signal does not occur within said interpulse spacing and a differential integrator responsive to said error signal for providing a correction signal for controlling the course of said mobile object.

References Cited in the file of this patent

UNITED STATES PATENTS

| | | |
|---|---|---|
| 1,998,834 | Englund | Apr. 23, 1935 |
| 2,198,113 | Holmes | Apr. 23, 1940 |
| 2,218,907 | Donelly et al. | Oct. 22, 1940 |
| 2,406,953 | Lewis | Sept. 3, 1946 |
| 2,408,773 | Goodall | Oct. 8, 1946 |
| 2,414,103 | Hunter | Jan. 14, 1947 |
| 2,418,137 | Noell | Apr. 1, 1947 |
| 2,419,525 | Alford | Apr. 29, 1947 |
| 2,444,445 | Isbister | July 6, 1948 |
| 2,472,129 | Streeter | June 7, 1949 |
| 2,508,565 | Chance | May 23, 1950 |
| 2,541,277 | Omberg et al. | Feb. 13, 1951 |

FOREIGN PATENTS

| | | |
|---|---|---|
| 546,000 | Germany | Mar. 8, 1932 |